Figure 1:
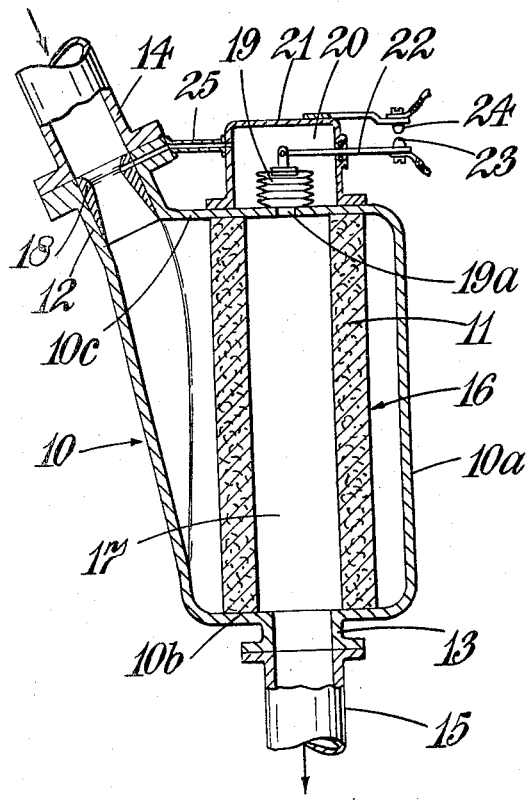

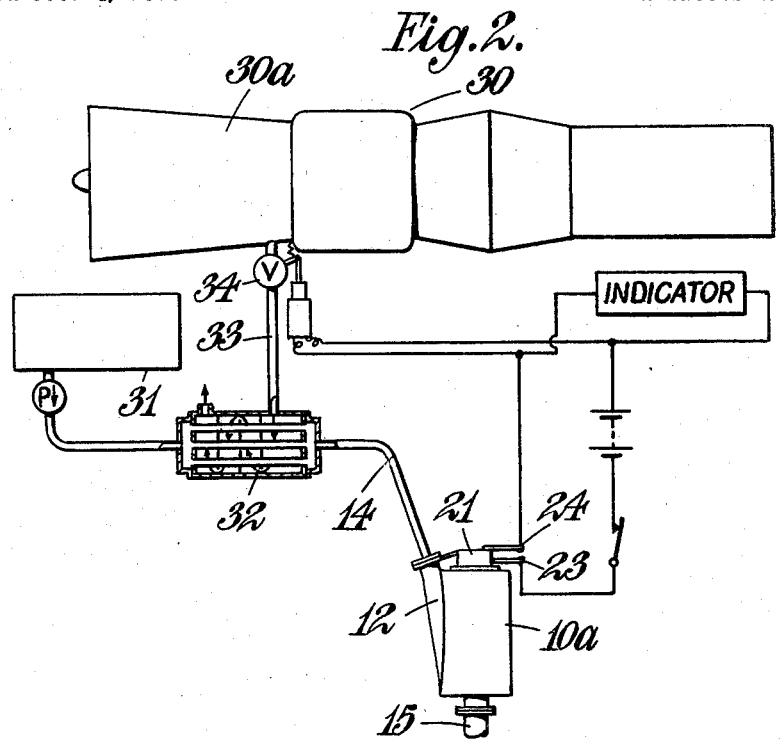
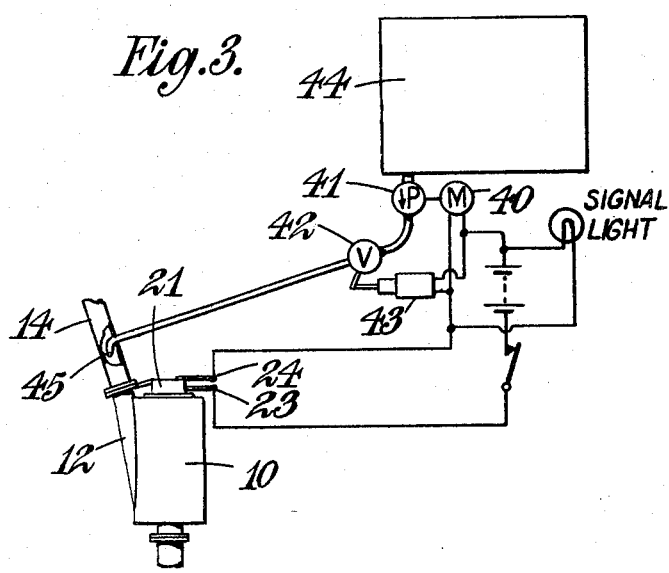

United States Patent Office 2,943,446
Patented July 5, 1960

2,943,446

MEANS SENSITIVE TO CHANGES IN THE EFFECTIVE RESTRICTION OF A RESTRICTIVE ELEMENT IN A FLOW CONDUIT

Donald George Goodall, Hucknall, and John Charles Chicken, Sherwood, England, assignors to Rolls-Royce Limited, Derby, England, a British company Filed Oct. 4, 1956, Ser. No. 614,013

Claims priority, application Great Britain Oct. 7, 1955

12 Claims. (Cl. 60—39.09)

This invention relates to pressure-sensitive means, and has for an object to provide pressure-sensitive means for measuring the degree of restriction afforded to a fluid flow.

According to the present invention there is provided in combination a conduit, a flow-restricting element in the conduit, and pressure-sensitive means for measuring the degree of restriction afforded by said element including a venturi in said conduit upstream of said element and a pressure-sensitive element subjected to the difference between the pressure at the throat of the venturi and the pressure downstream of said element, said pressure-sensitive means being adapted to give an indication or to effect a control.

The venturi may be so dimensioned that, at least over a limited range of rates of flow of fluid, the pressure difference from the inlet to the throat of the venturi is approximately equal to the pressure difference from upstream to downstream of the restricting element under normal operating conditions. Thus it may be arranged that the pressure difference to which the pressure-sensitive element is subjected is substantially zero for a given degree of restriction, and that the pressure difference increases when the degree of restriction is increased.

Alternatively, the pressure difference in the venturi may be selected to be less or greater than that across the flow-restricting element so that the pressure-sensitive element is subjected under normal operating conditions to a small positive or negative pressure difference.

The pressure-sensitive element may be arranged to give an indication or effect a control when the degree of restriction increases under abnormal conditions above a certain value, for example by being arranged to operate switch contacts.

The invention is particularly applicable to aircraft fuel systems, where the degree of restriction afforded by a restricting element in the fuel flow conduit from a fuel tank to an engine may increase above the normal working value owing to the formation of ice in or on the element. The restricting element in this case may be a filter in the fuel flow conduit.

Some embodiments of this invention will now be described by way of example with reference to the accompanying drawings in which:

Figure 1 is a vertical sectional view of a filter constructed in accordance with the present invention and positioned in a conduit which may for example be the fuel conduit leading from a fuel storage tank of an aircraft to an engine of the aircraft, and Figures 2 and 3 show modifications of the arrangement shown in Figure 1.

The present invention may be applied to aircraft fuel systems as described and claimed in United States application Serial No. 396,622, now Patent No. 2,925,712 wherein the aircraft fuel system comprises a fuel tank from which fuel is supplied to an engine of the aircraft and heat exchanger means adapted to be supplied with relatively warm air to heat the fuel, which air has been heated by compression in a compressor of an engine but which air has not been heated by combustion of fuel therein, and which is tapped from an engine of the aircraft, whereby a fuel supply to the engine is maintained under low temperature operating conditions. In applying the invention to such a fuel system, the pressure-sensitive means will preferably be arranged to control the supply of the relatively warm air to the heat exchanger means. Preferably the supply of air will be initiated when the degree of restriction, as measured by the pressure difference to which the pressure-sensitive means is subjected, increases above a certain value. This value will be indicative of at least partial blockage of the fuel flow conduit, such as may occur in abnormal conditions due to ice formation on, for example, a filter element.

Alternatively the invention may be used to control the injection of alcohol or other de-icing fluid into the fuel conduit to de-ice the filter element. Such a system would normally comprise an alcohol tank, an injection pump, for example electrically-driven, a control valve and injection nozzle. In applying the invention to such a system the supply of alcohol will be initiated by the operation of a switch actuated by the pressure-sensitive means under abnormal conditions such as mentioned, the switch controlling the power supply to the electric motor and to a solenoid or the like actuating the control valve.

The filter comprises a casing 10 of substantially cylindrical form within which is positioned a filter element 11 spaced inwardly from the cylindrical wall 10a of the casing and in sealing engagement with the end walls 10b, 10c, of the casing. The filter casing also comprises a portion 12 projecting from one side of the cylindrical wall 10a to form an inlet and a portion 13 projecting from one end wall 10b to form an outlet. The inlet is connected to an upstream portion 14 of the fuel conduit and the outlet is connected to a downstream portion 15 of the fuel conduit.

In operation, fuel flows from the upstream portion 14 of the conduit into the annular space 16 between the cylindrical wall 10a of the filter casing 10 and the filter element 11 and then flows through the filter element, which strains out any solid matter, into the central space 17, whence the fuel flows through the outlet connection 13 to the downstream portion 15 of the conduit.

It is well-known that the pressure drop across such a filter element increases as the rate of flow increases, and may increase either linearly with the flow, in the case of a fine filter, or proportionally to the square of the rate of flow in the case of a coarse filter, and it will therefore be appreciated that a pressure-sensitive device which is sensitive only to the pressure drop across the filter element and which is arranged to operate at a low rate of flow when the pressure drop rises owing to the filter becoming partially blocked, will also operate at a high rate of flow when the filter is free from blockage. The present invention seeks to avoid this difficulty.

In the arrangement of the present invention, the inlet portion 12 of the filter casing 10 is provided with a venturi 18 through which the fuel flows on entering the casing, and there is provided a bellows 19 which is attached to the end wall 10c of the casing remote from the fuel outlet 13 and which is contained in a chamber 20 afforded within a casing 21. The interior of the bellows 19 is connected through a port 19a to the central space 17 of the filter, that is, the space downstream of the filter element 11, and the chamber 20 is connected by a duct 25 to the throat of the venturi 18. The bellows 19 is thus subjected to the difference of the fuel pressures at the throat of the venturi 18 upstream of the filter element 11 and within the space 17 which is downstream of the filter element. The bellows is connected to one end of a lever 22, the other end of which carries a switch contact 23, and there is provided a stationary contact 24, the arrangement being such that the contacts 23, 24 are closed when the pressure difference to which the bellows 19 is subjected exceeds a selected value, and the contacts 23, 24 are broken when the pressure difference is less than this value.

It may be arranged that the pressure difference from the inlet to the throat of the venturi 18 at a given rate of flow within the working range of flows is approximately equal to or just less than the pressure difference across the filter element 11 when this has a small and acceptable degree of blockage such as may be caused by dirt. Thus under normal conditions the pressures applied on each side of the bellows 19 will be equal and the switch contacts will not close; or there will be a small positive pressure difference from the venturi throat to downstream of the element which tends to cause collapse of the bellows 19 but is insufficient to cause the switch contacts to close. However, in each case, should a large degree of blockage of the filter element occur, due for example to the formation of ice, the pressure difference tending to collapse the bellows will increase irrespective of the rate of flow, and if it increases above the selected value the contacts 23, 24 will close.

The ratio of the inlet area of the venturi to the throat area may thus be chosen so that the pressure difference from the inlet to the throat of the venturi is somewhat less than the pressure difference across the filter element within the working range of fuel flows.

It will be appreciated that the pressure difference from the inlet to the throat of the venturi 18 will increase substantially as the square of the rate of flow; with a coarse filter the pressure difference across the filter also increases substantially as the square of the rate of flow; thus if the two pressure differences are arranged to be approximately equal at one rate of flow with the filter element having a small and acceptable degree of blockage, they will likewise be approximately equal at other flow rates. However, when the degree of blockage of the filter increases excessively, the bellows is subjected to a positive pressure difference which is substantially independent of the rate of flow at least over a range of flows and the bellows collapses to close the contacts 23, 24.

With fine filters the pressure difference increases linearly as the rate of flow, and in this case it is arranged that the pressure difference from the inlet to the throat of the venturi is somewhat less than the pressure difference across the filter element within the working range of flows, so that the bellows will normally be subjected to a small positive pressure difference. The switch contacts may be arranged to close at, say, twice this value. It will therefore be appreciated that even a comparatively small blockage of the filter may be detected by an increase in the pressure difference to which the bellows 19 is subjected, irrespective of the rate of flow, at least over a limited range of fuel flows.

An advantage of the above arrangement is that the pressure in the venturi throat is greater than the pressure in the system downstream of the filter element, and therefore if air is not released from solution in the fuel in the downstream part of the system, it will also not be released in the venturi.

Alternatively, it may be arranged that the pressure difference from the inlet to the throat of the venturi 18 is greater than the pressure drop across the filter, at least at high rates of flow. With a coarse filter where the pressure loss is substantially proportional to the square of the rate of flow, this condition will exist throughout the full range of flow; in the case of a fine filter in which the pressure difference increases linearly as the rate of flow, the pressure difference between the inlet and throat of the venturi will be less than the pressure difference across the filter at low rates of flow. Thus it will be appreciated that with this arrangement the bellows 19 will be subjected at least under high rates of flow to a negative pressure difference, and at low rates of flow to a lesser negative pressure difference or to a small positive pressure difference. The advantage of this arrangement is that the pressure difference required to close the contacts 23, 24 at high rates of flow may be selected to permit a relatively large increase of blockage due to normal dirt contamination, without necessitating a pressure switch setting which would give an excessive pressure loss due to blockage of the filter occurring at low flow conditions with subsequent increase of fuel flow to a high value.

Such a differential pressure switch may be applied with advantage to the arrangement described and claimed in United States application Serial No. 396,622 (Rolls-Royce Limited). In such an application the bellows will be arranged to control the supply of warm air to the heat exchanger, and the supply of warm air will be initiated when the pressure difference to which the pressure-sensitive bellows is subjected increases above the selected value indicative of the formation of ice in the filter.

For instance, as shown in Figure 2 fuel for a gas-turbine engine 30 is fed from a storage tank 31 through one flow path of a heat exchanger 32 into the upstream portion 14 of the fuel conduit leading to the filter 10. The other flow path of the heat exchanger 32 receives warm air from the compressor 30a of the engine 30 through conduit 33 containing a valve 34 opening of which is effected by energization of a solenoid on closure of the contacts 23, 24.

In Figure 3, closure of contacts 23, 24 initiates operation of an electric motor 40 driving a pump 41 and energizes solenoid 43 to open valve 42, thereby to permit supply of de-icing fluid, for instance alcohol, from storage tank 44 to an injection nozzle 45 arranged in the upstream portion 14 of the fuel conduit.

We claim:

1. In combination a conduit having a flow restricting element therein, pressure-sensitive means for measuring the degree of restriction afforded by said element including a venturi in said conduit upstream of said element and a pressure-sensitive element subjected to the difference between the pressure at the throat of the venturi and the pressure downstream of said element, said pressure-sensitive means being adapted to provide a signal indicative of the degree of restriction of said restricting element, which signal is substantially independent of rate of flow in said conduit.

2. The combination according to claim 1, wherein the venturi is dimensioned so that at least over a limited range of rates of flow of fluid, the pressure difference from the inlet to the throat of the venturi is approximately equal to the pressure difference from upstream to downstream of the restricting element under normal operating conditions.

3. The combination according to claim 1, wherein the venturi is dimensioned so that at least over a limited range of rates of flow of fluid, the pressure difference from the inlet to the throat of the venturi is greater than the pressure difference from upstream to downstream of the restricting element under normal operating conditions so that the pressure-sensitive element is subjected under normal operating conditions to a negative pressure difference.

4. The combination according to claim 1, wherein the venturi is dimensioned so that at least over a limited range of rates of flow of fluid, the pressure difference from the inlet to the throat of the venturi is less than the pressure difference from upstream to downstream of the restricting element under normal operating conditions so that the pressure-sensitive element is subjected under normal operating conditions to a positive pressure difference.

5. The combination according to claim 1, wherein the pressure-sensitive means is arranged to give an indication when the degree of restriction increases above a certain value.

6. The combination according to claim 1, wherein the conduit is a fuel conduit of an aircraft fuel system and the restricting element is a part of the fuel system in which the restriction to fuel flow may increase owing to formation of ice in the restricting element.

7. The combination according to claim 6, wherein the restricting element is a fuel filter.

8. The combination according to claim 6 comprising a source of air which is warm relative to the fuel, and heat exchange means connected to said source and also connected in the fuel system to permit fuel and the relatively warm air to be passed in heat exchange, wherein the pressure sensitive means is arranged to control the supply of the relatively warm air to the heat exchanger means.

9. The combination according to claim 6 applied in a fuel system in which provision is made for injecting de-icing fluid into the fuel conduit to de-ice the filter.

10. In a fuel system, a fuel conduit for carrying a flow of fuel, a fuel filter connected in said conduit, a venturi having a throat and connected in said conduit upstream of and in flow series arrangement with said fuel filter, a pressure-sensitive element, and means subjecting said pressure-sensitive element to the difference between the pressure at the throat of the venturi and the pressure in the conduit downstream of said fuel filter, the pressure-sensitive element, during flow of fuel through said conduit, thereby providing an indication of the degree of restriction afforded by said filter which indication is substantially independent of the rate of fuel flow.

11. In a fuel system according to claim 10, means to reduce restriction of said fuel filter and means connected to said pressure-sensitive device to be actuated thereby and operatitve to actuate said means to reduce the restriction of the fuel filter.

12. The combination according to claim 1, wherein the pressure-sensitive means is arranged to effect a control when the degree of restriction increases above a certain value.

References Cited in the file of this patent
UNITED STATES PATENTS

| | | |
|---|---|---|
| 1,874,707 | Oswald | Aug. 30, 1932 |
| 2,090,069 | Richardson et al. | Aug. 17, 1937 |
| 2,406,181 | Wiegand | Aug. 20, 1946 |
| 2,451,280 | Del Mar | Oct. 12, 1948 |
| 2,545,815 | Klinge | Mar. 20, 1951 |
| 2,647,366 | McCann | Aug. 4, 1953 |
| 2,670,082 | Dunn et al. | Feb. 23, 1954 |
| 2,729,339 | McCoy | Jan. 3, 1956 |